US011168753B2

(12) United States Patent
Pierangelo et al.

(10) Patent No.: US 11,168,753 B2
(45) Date of Patent: Nov. 9, 2021

(54) BRAKE CALIPER

(71) Applicant: FRENI BREMBO S.P.A., Bergamo (IT)

(72) Inventors: Gherardi Pierangelo, Curno (IT); Daniele Angelo Penati, Curno (IT); Alberto Comenduli, Curno (IT); Roberto Arienti, Curno (IT); Carlo Cantoni, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 0 days.

(21) Appl. No.: 16/471,232

(22) PCT Filed: Nov. 30, 2017

(86) PCT No.: PCT/IB2017/057541
§ 371 (c)(1),
(2) Date: Jun. 19, 2019

(87) PCT Pub. No.: WO2018/116038
PCT Pub. Date: Jun. 28, 2018

(65) Prior Publication Data
US 2020/0386286 A1 Dec. 10, 2020

(30) Foreign Application Priority Data
Dec. 19, 2016 (IT) .................. 102016000128163

(51) Int. Cl.
*F16D 65/097* (2006.01)
*F16D 65/00* (2006.01)
*F16D 55/00* (2006.01)

(52) U.S. Cl.
CPC ..... *F16D 65/0972* (2013.01); *F16D 65/0075* (2013.01); *F16D 65/0087* (2013.01); *F16D 2055/0029* (2013.01)

(58) Field of Classification Search
CPC ............... F16D 65/0972; F16D 65/087; F16D 65/0075; F16D 2055/0029; F16D 2055/0075
See application file for complete search history.

(56) References Cited

U.S. PATENT DOCUMENTS

| 5,687,817 A * | 11/1997 | Kobayashi ............ F16D 65/097 188/72.3 |
| 2010/0277875 A1* | 11/2010 | Moorehead, Jr. .... H05K 7/1412 361/747 |

(Continued)

FOREIGN PATENT DOCUMENTS

| DE | 4418703 A1 | 11/1995 |
| JP | 2007092848 A | 4/2007 |
| WO | WO-2014195910 A1 * | 12/2014 ............. F16D 65/62 |

OTHER PUBLICATIONS

European Patent Office, International Search Report and Written Opinion in Application No. PCT/IB2017/057541, dated Mar. 12, 2018, 10 pages, Rijswijk, Netherlands.

*Primary Examiner* — Melody M Burch
(74) *Attorney, Agent, or Firm* — Marshall & Melhorn, LLC (57) ABSTRACT

A brake caliper for a disc brake having a caliper body, a brake pad and at least one retraction device of the brake pad from a braking disc is described. The device is configured to retract the brake pad from at least one of opposite braking surfaces delimited by the braking disc. The caliper body delimits a first pad abutment surface to delimit a tapered space with the braking surface of the braking disc, the first pad abutment surface being oriented so that, during the braking action, the surface guides the brake pad wedging in the tapered space. The brake pad delimits a retraction surface, inclined in a non-orthogonal direction with respect to the pad plane and oriented so that, during the retraction (Continued)

action, the brake pad is guided partially outside of the tapered space.

16 Claims, 7 Drawing Sheets

(56) References Cited

U.S. PATENT DOCUMENTS

| | | | | |
|---|---|---|---|---|
| 2013/0133991 A1* | 5/2013 | Thomas | ................ | F16D 65/44 |
| | | | | 188/73.31 |
| 2014/0196993 A1* | 7/2014 | Iraschko | ................ | B60T 1/065 |
| | | | | 188/73.32 |
| 2014/0345984 A1* | 11/2014 | Kamiya | ............ | F16D 65/0972 |
| | | | | 188/73.38 |
| 2016/0053837 A1* | 2/2016 | Lou | ................ | F16D 65/0978 |
| | | | | 188/73.38 |
| 2016/0076611 A1* | 3/2016 | Boyle | ................ | F16D 65/0972 |
| | | | | 188/72.3 |
| 2016/0131213 A1* | 5/2016 | Comenduli | ............ | F16D 65/62 |
| | | | | 188/71.8 |
| 2019/0331179 A1* | 10/2019 | Rankin | ................ | F16D 65/005 |

* cited by examiner

BRAKE CALIPER

FIELD OF THE INVENTION

The present invention relates to a brake caliper with a distancing device of a brake pad from a braking disc.

More in particular, the present invention relates to a brake caliper which comprises a caliper body arranged straddling a braking disc and which houses pads which abut against opposite braking surfaces of the braking disc, whereby applying a braking action when biased by thrust means housed in the caliper body.

As known, once the braking action of a vehicle ends, the braking system ceases to generate a thrust by means of the thrust device, which frequently comprises a piston housed in a cylinder of a caliper body fixed to a suspension and arranged straddling a brake disc fixed to a rotating wheel hub. When the thrust ceases, the pad may not move away from the braking surface of the disc and, also because of the rotation of the disc and of manufacturing tolerances, as well as deformations generated by brake use, the pad continues to skim said braking surface, whereby generating a residual braking torque which causes noise, undesired consumption of fuel and friction material, reduction of performance, and other drawbacks.

PRIOR ART

In order to solve this problem, it is known to introduce a slight retraction of the piston (roll-back), e.g. by virtue of the elastic recovery of some seals envisaged between piston and cylinder, and it is also known to arrange a spring which constantly biases the pads away from the brake disc—in a direction opposite to the working direction of the thrust device—so as to avoid accidental contacts and the generation of the residual braking force.

However, the known springs display insurmountable drawbacks of construction complexity and reliability over time.

So, the need is strongly felt for a device which makes it possible to retract the pads by an entity with respect to the braking surfaces of the brake disc when the controlled braking action ceases.

SUMMARY OF THE INVENTION

It is the object of the present invention to suggest a brake caliper which makes it possible to achieve the aforesaid needs and to solve the drawbacks of the prior art mentioned hereto.

These and other objects are achieved by a brake caliper according to claim 1. Some advantageous embodiments are the object of the dependent claims.

DESCRIPTION OF THE FIGURES

Further features and advantages of the brake caliper and method according to the invention will be apparent from the description provided below of preferred embodiments thereof, given by way of non-limiting examples, with reference to the accompanying drawings, in which.

DETAILED DESCRIPTION OF THE INVENTION

Figure 1:
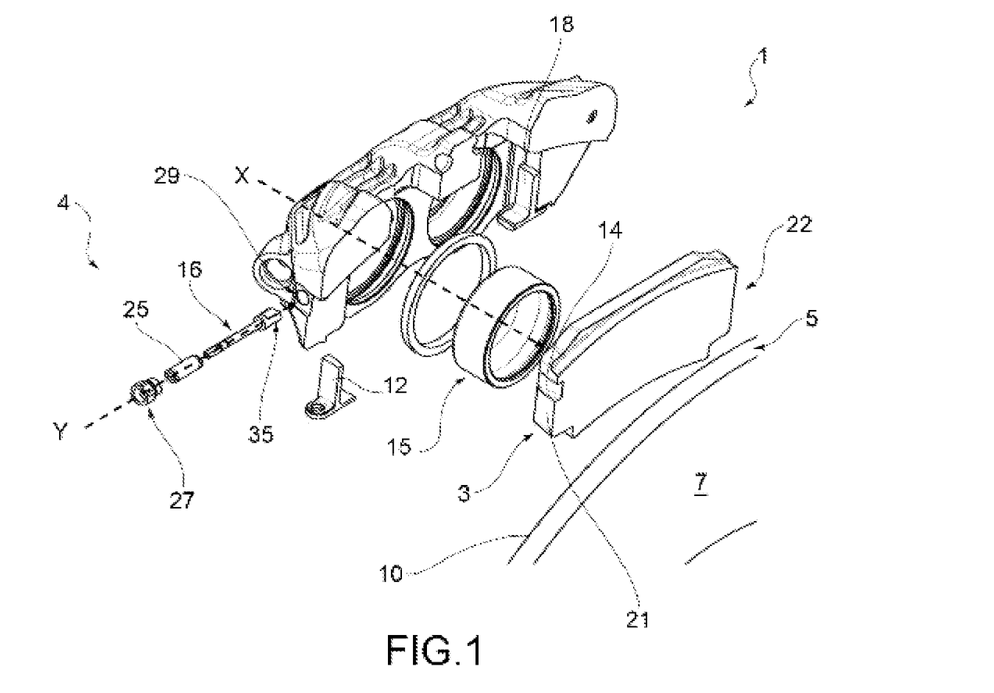
FIG. 1 shows an exploded perspective view of a brake caliper, according to the present invention, according to a first embodiment, wherein in such figure the brake caliper is shown partially in section.
Figure 2A:
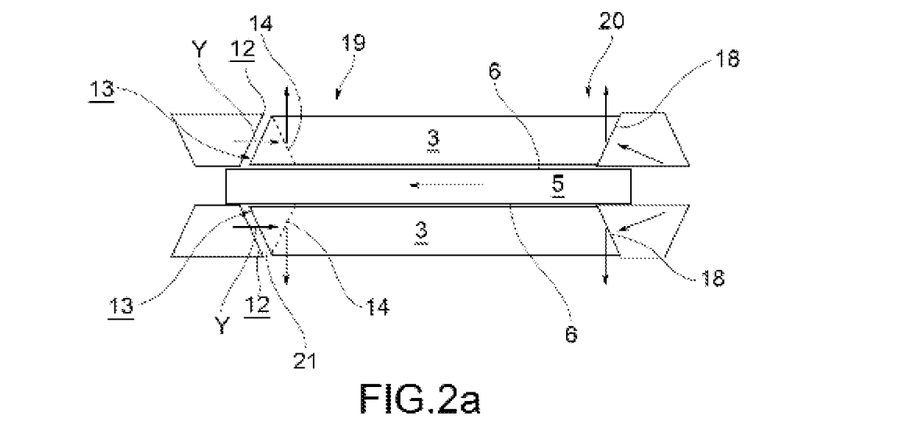
FIG. 2A diagrammatically shows the forces acting on a pair of pads of a brake caliper according to a variant of the invention.
Figure 2B:
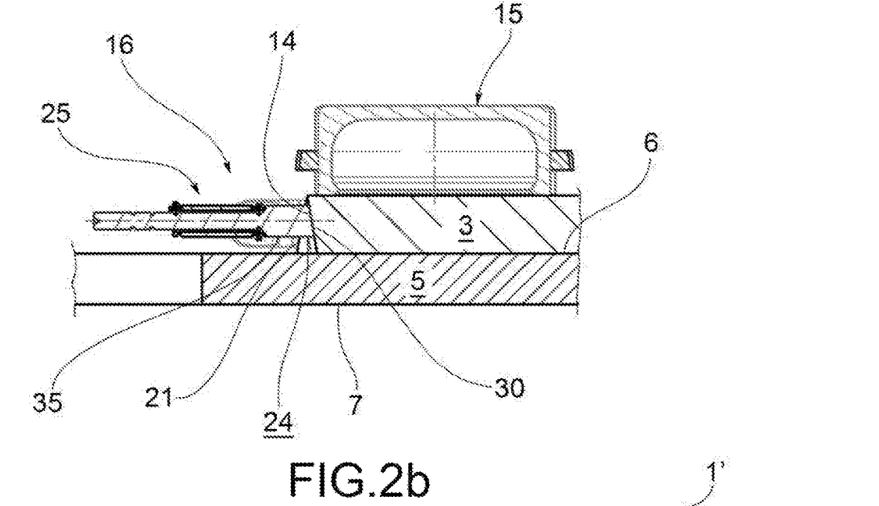
FIG. 2B shows the main components of the brake caliper according to the invention, according to a possible variant.
Figure 3:
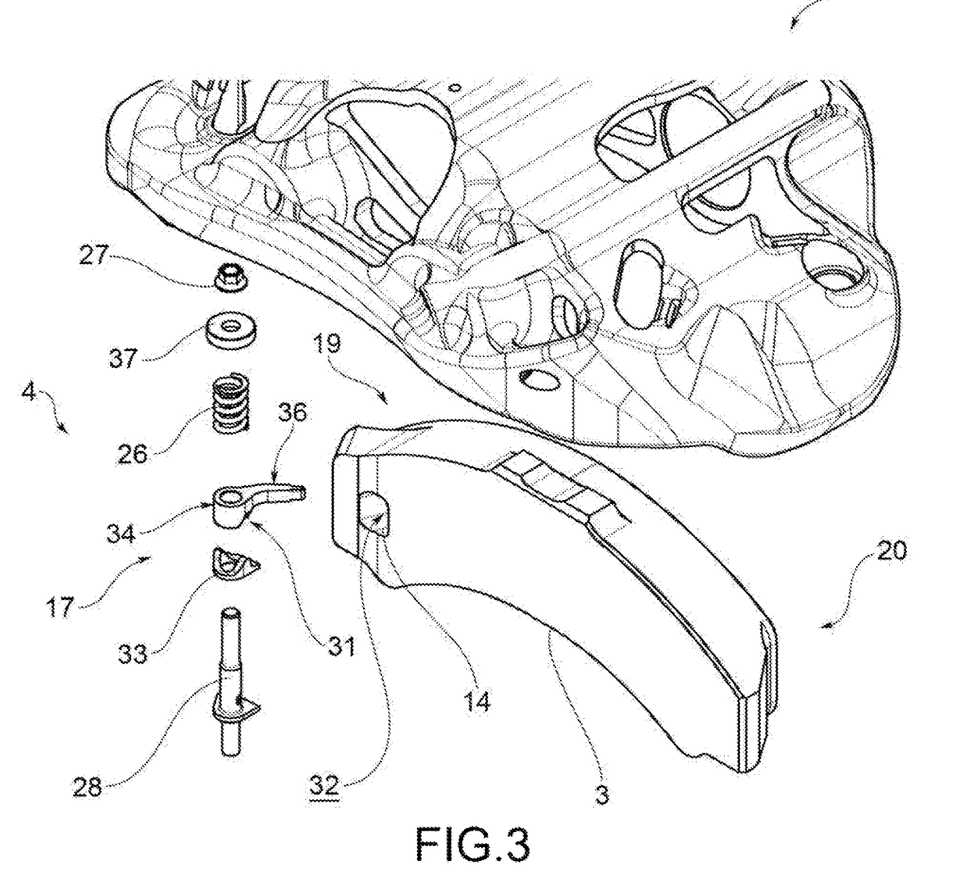
FIG. 3 shows an exploded perspective view of a brake caliper, according to the present invention, according to a second embodiment.
Figure 4:
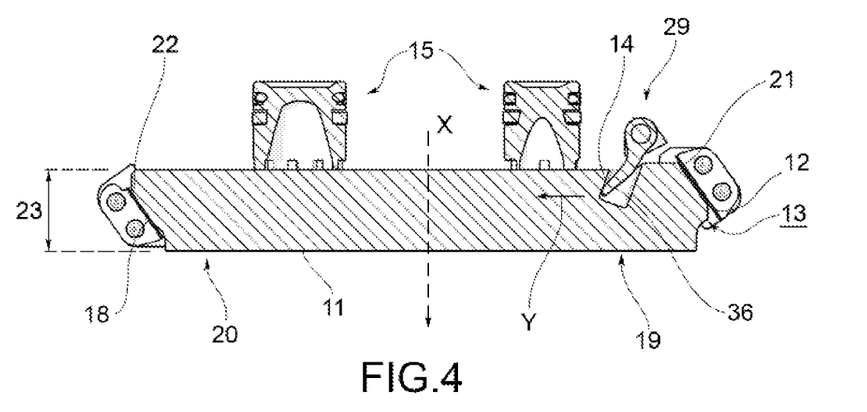
FIG. 4 shows a tangential section by means of a pad of the brake caliper according to FIG. 3.
Figure 5:
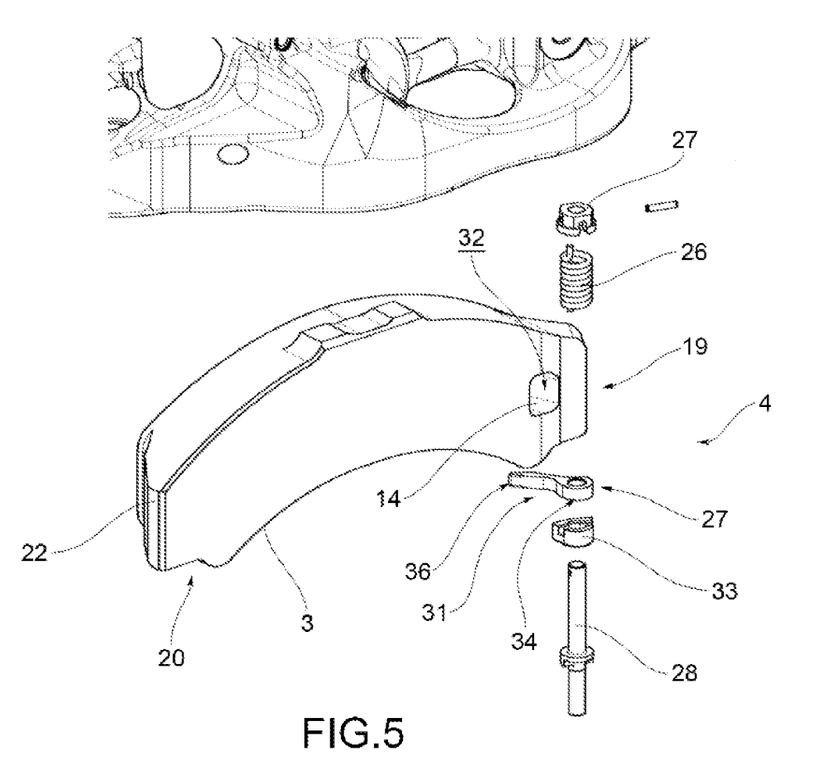
FIG. 5 shows an exploded perspective view of a brake caliper, according to the present invention, according to a third embodiment.
Figure 6:
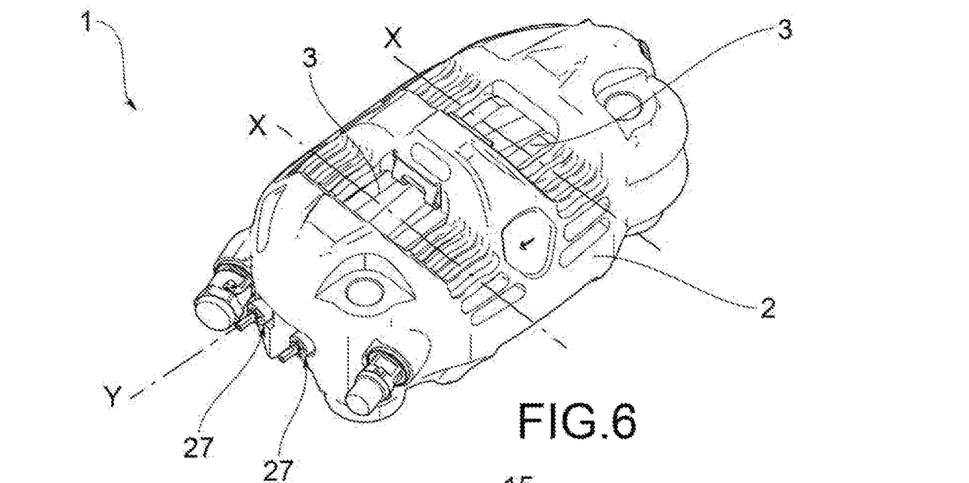
FIG. 6 shows a perspective view from the top of the brake caliper according to an embodiment of shown in FIG. 1.
Figure 7:
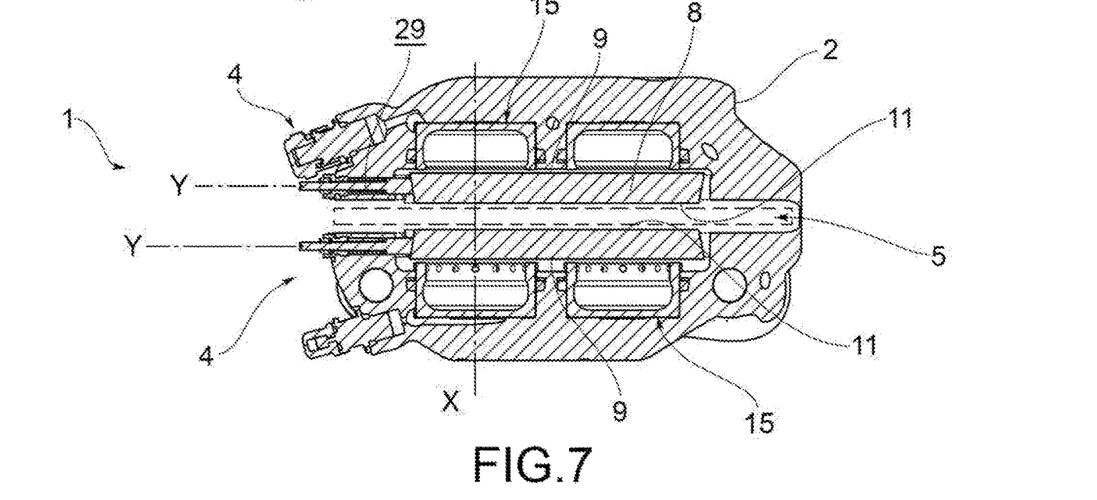
FIGS. 7 to 9 show the caliper according to the variant in FIG. 6 respectively in cross section across the brake pads at the height of the retraction device, in longitudinal median section between the pair of brake pads, in longitudinal section along a plane orthogonal to the pad planes.
Figure 8:
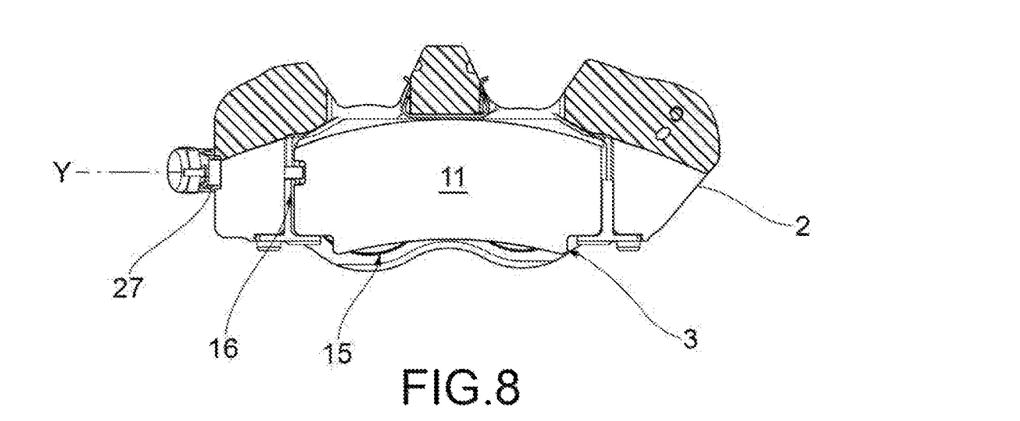
Figures 9, 10:
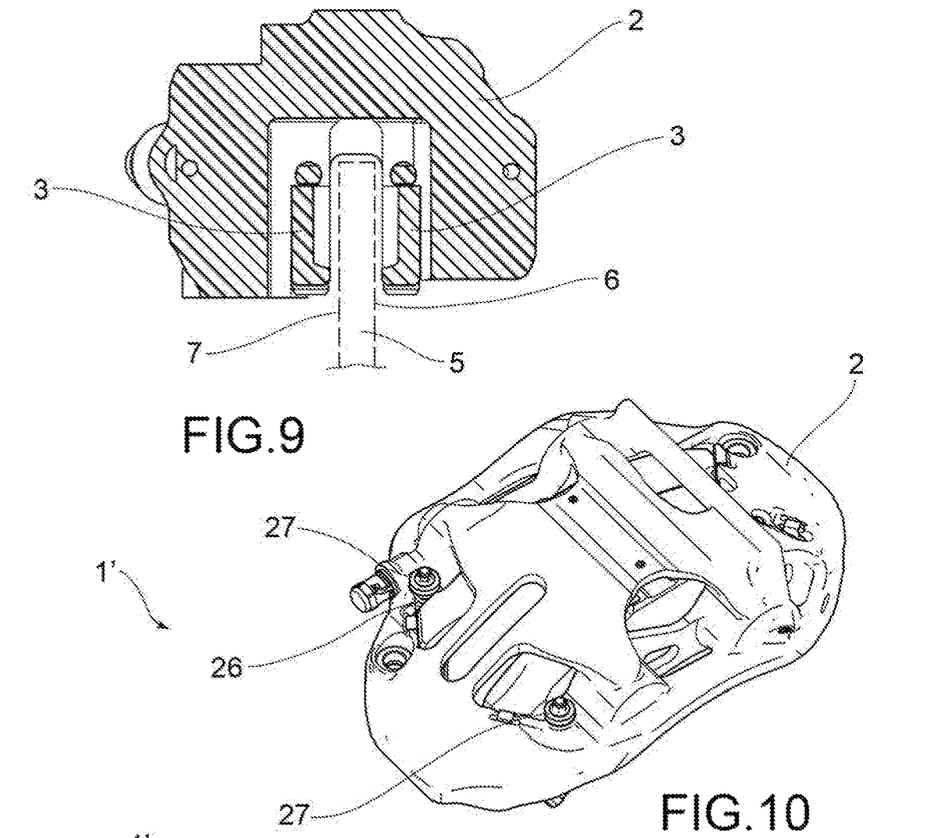
FIGS. 10 and 11 show perspective views from the top of two brake calipers according to further embodiments.
Figure 11:
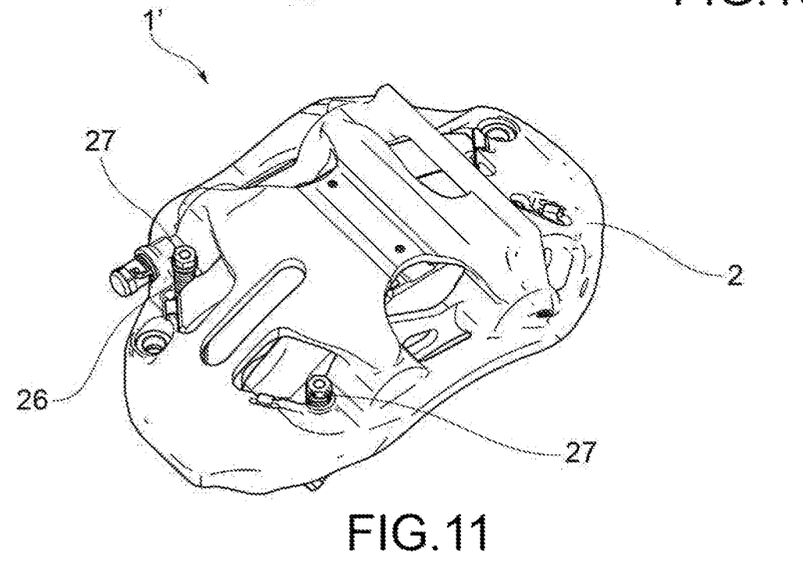
Figure 12:
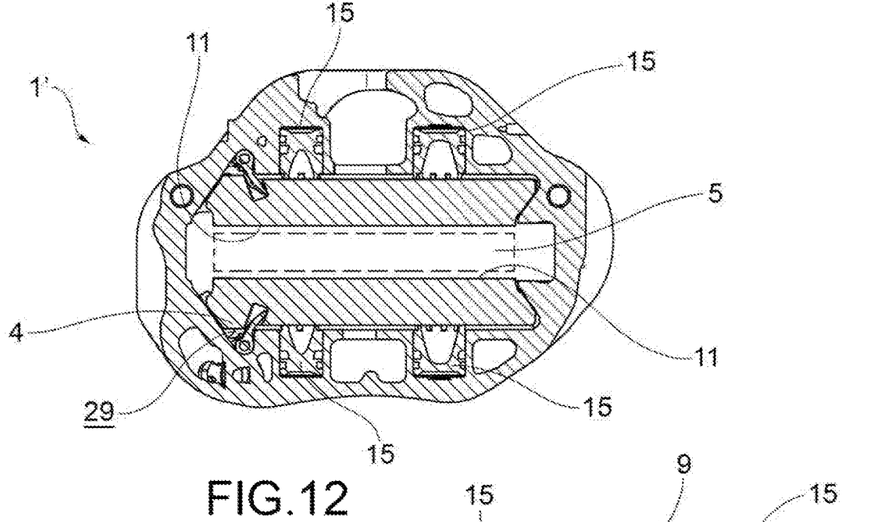
FIGS. 12, 14, 16 show the caliper according to the variant in FIG. 10 respectively in cross section across the brake pads at the height of the working portion, in longitudinal median section between the pair of brake pads, in longitudinal section along a plane orthogonal to the pad planes.
Figure 13:
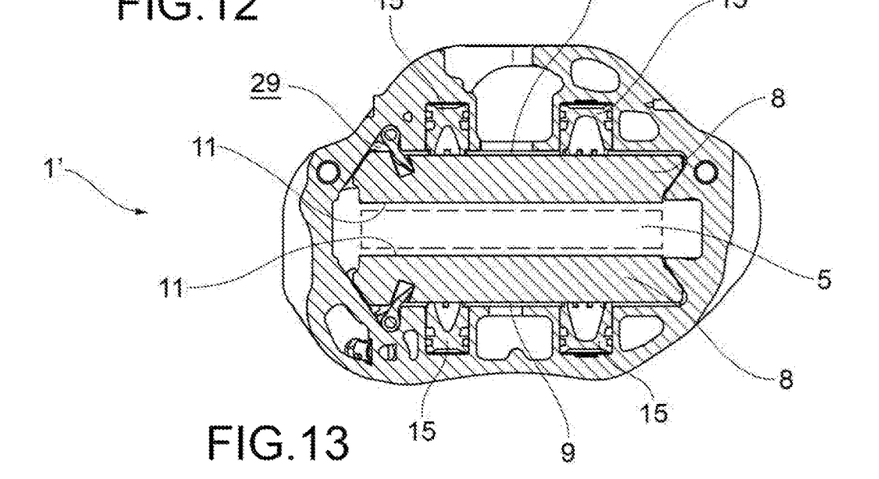
FIGS. 13, 15, 17 show the caliper according to the variant in FIG. 11 respectively in cross section across the brake pads at the height of the working portion, in longitudinal median section between the pair of brake pads, in longitudinal section along a plane orthogonal to the pad planes.
Figure 14:
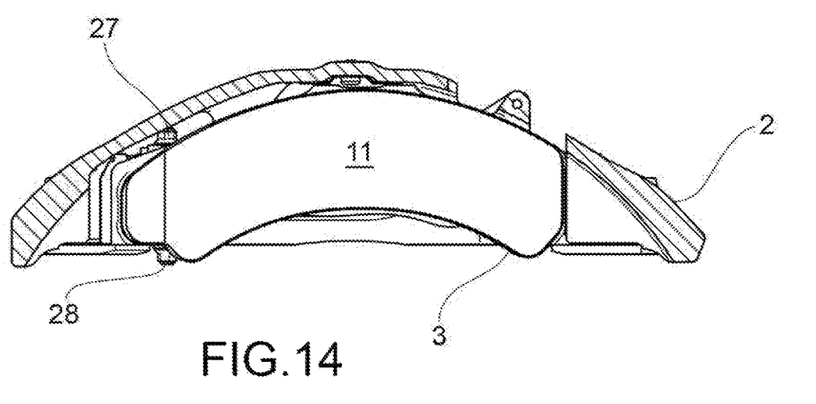
Figure 15:
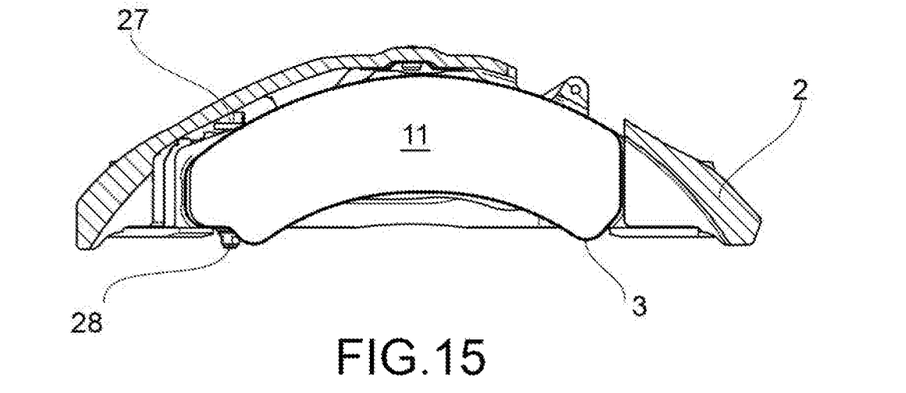
Figure 16:
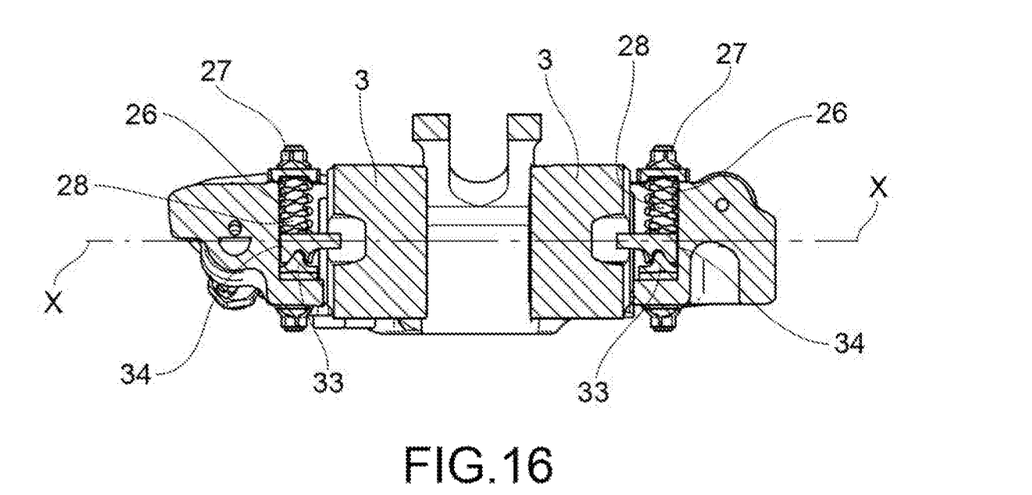
Figure 17:
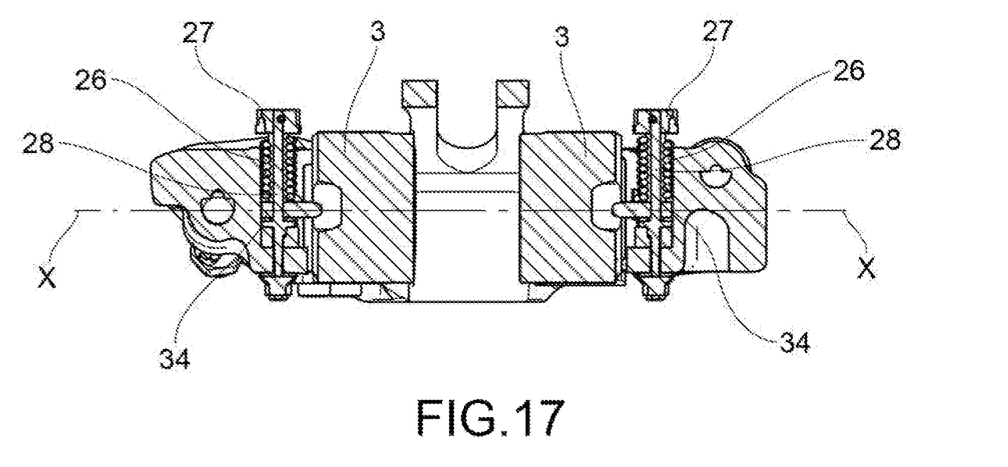

With reference to the aforesaid figures and according to a general embodiment, a brake caliper 1, 1' comprises a caliper body 2, a brake pad 3 and at least one retraction device 4 of the brake pad from a braking disc 5 configured to retract such brake pad 3 from at least one of opposite braking surfaces 6, 7 delimited by the braking disc 5.

The brake pad 3 comprises a friction material 8 which delimits a pad plane 11 adapted to abut against the braking surface 6, 7 to apply a braking action on the braking disc 5.

Such brake pad 3 is adapted to receive a thrust along an axial direction X-X by at least one thrust device 15 housed in the caliper body 2.

According to an embodiment, the brake pad 3 may comprise an optional supporting plate 9 of the friction material 8 adapted to receive the aforesaid thrust from the thrust device 15.

According to an embodiment, the retraction device 4 of the brake pad 3 is separate from each thrust device 15, in particular to avoid interfering in any way with an optional roll-back device.

The caliper body 2 delimits a first pad abutment surface 12, inclined in a non-orthogonal direction with respect to the pad plane 11 to delimit a tapered space 13 with the braking surface 6, 7 of the braking disc 5, the latter being substantially planar.

The first pad abutment surface 12 is oriented so that, during the braking action, such surface 12 guides the brake pad 3 wedging in the tapered space 13. In such manner, the braking action is extremely efficient, because the tapered space originates a further axial force (i.e. parallel to the axial direction X-X) which is added to the one created by the thrust device 15.

According to the invention, the brake pad 3 delimits a retraction surface 14, inclined in a non-orthogonal direction with respect to the pad plane 11 and oriented so that, during the retraction action, the brake pad 3 is guided partially outside the tapered space 13.

The retraction device 4 of the brake pad 3 comprises a working portion 16, 17, movable in a transverse direction Y-Y, either incident or substantially orthogonal with respect to the axial direction X-X, such portion 16, 17 being pressed in abutment on the retraction surface 14, slidably along the latter, to retract the brake pad 3.

According to an embodiment, the working portion 16, 17 is an end portion of a linear slider 35 or of a rotational slider 36 elastically biased between the caliper body 2 and the retraction surface 14 to retract the brake pad 3.

According to an embodiment, the retraction surface 14 makes a cam surface oriented so that a movement of the brake pad 3 in a direction opposite to the axial direction X-X corresponds to the movement of the working portion 16, 17 along the transverse direction Y-Y.

According to an embodiment, the transverse direction Y-Y is either parallel to, or coincident with, a direction tangential to the brake disc.

According to an embodiment, the caliper body 2 delimits a second pad abutment surface 18, opposite to the first pad abutment surface 12, on which the brake pad 3 is pressed by the working portion 16, 17, so as to guide the retraction in at least two pad portions 19, 20 of the brake pad 3.

According to an embodiment, the pad portions 19, 20 of the brake pad 3 are opposite end portions.

According to an embodiment, the inclinations of the first pad abutment surface 12, of the second pad abutment surface 18 and of brake pad surfaces 21, 22 intended to slidably abut along the first pad abutment surface 12 and along the second pad abutment surface 18 are selected so that the advancement and retraction with respect to the braking surface 6, 7 are guided maintaining the pad plane 11 substantially parallel.

According to an embodiment, the retraction surface 14 extends at least partially in the thickness of the brake pad 3.

According to an embodiment, the retraction surface 14 at least partially develops in the thickness 23—globally considered—of the brake pad 3 (i.e. of the friction material 8 and of the optional supporting plate 9).

According to an embodiment, the first pad abutment surface 12 delimits an opening 24 for crossing of the working portion 16, 17, so that the latter can jut out from the caliper body 2 to lean on the retraction surface 14.

According to an embodiment, the adjustment element 27 can be maneuvered to modify the pre-load force of the elastic means 25, 26.

According to an embodiment, the adjustment element 27 can be maneuvered to modify said force.

According to an embodiment, the caliper body 2 and the adjustment element 27 are coupled by means of complementary threads to allow said pre-load force adjustment.

According to an embodiment, a guide-spring rod 28 connected to the caliper body 2 and the adjustment element 27 are coupled by means of complementary threads to allow said pre-load force adjustment.

According to an embodiment, the intermediate body 37 is in the shape of disc or plate.

According to an embodiment, the adjustment element 25, 26 can be maneuvered to modify the pre-load force of the elastic means 25, 26.

According to an embodiment, the adjustment element 25, 26 can be maneuvered to modify said force.

According to an embodiment, the caliper body 2 and the adjustment element 25, 26 are coupled by means of complementary threads to allow said pre-load force adjustment.

According to an embodiment, a guide-spring rod 28 connected to the caliper body 2 and the adjustment element 25, 26 are coupled by means of complementary threads to allow said pre-load force adjustment.

According to an embodiment, the intermediate body 37 is crossed by the guide-spring rod 28 in a through manner.

According to an embodiment, the working portion 16, 17 is slidably, or rotatably, hosted in a seat 29 delimited by the caliper body 2.

According to an embodiment, the seat 29 comprises a conduit ending in the opening 24.

According to an embodiment, the linear slider 35 comprises a head delimiting a contact surface 30 with the retraction surface 14, the contact surface 30 having substantially the same inclination as the retraction surface 14.

According to an embodiment, the rotational slider 36 comprises a working lever 31 hinged to the caliper body 2.

According to an embodiment, the working lever 31 protrudes into a recess 32 of the brake pad 3 delimited in part by the retraction surface 14.

According to an embodiment, the working lever 31 comprises a ring portion 34 fitted on the guide-spring rod 28.

According to an embodiment, the working lever 31 comprises a hooked position inserted in the recess 32.

According to an embodiment, the elastic means 26 comprise a helical spring or a torsional spring, which promotes a rotation of the working lever 31 by means of a cam-shaped element 33 in abutment with said lever 31.

According to an embodiment, the elastic means 25 comprise a helical spring which abuts on the head of the working portion 16, 17.

According to an embodiment, the caliper is a caliper in fixed caliper body 2 comprising at least one thrust device 15 in each of the opposite sides thereof facing the opposite braking surfaces 6, 7 when the caliper is arranged straddling the braking disc 5.

According to an embodiment, two separate retraction devices of the pad are envisaged placed at least one on each of the opposite brake pads 3.

According to an embodiment, the brake caliper 1, 1' is a caliper for motorcycles in which the force with which the working portion 16, 17 is pressed against the retraction surface 14 may have values up to 5N-15N.

According to an embodiment, the brake caliper 1, 1' is a caliper for cars in which the force with which the working portion 16, 17 is pressed against the retraction surface 14 may have values up to 70N-100N.

By virtue of the features described above, either mutually separately or jointly in particular embodiments, a brake caliper can be obtained which satisfies the aforesaid mutually contrasting needs and the aforesaid desired advantages at the same time, and in particular which:

makes it possible to solve the strongly felt need of finding an assembly which allows the distancing of the pad from the braking surface to avoid the formation of residual torques at the end of the braking action itself;

makes it possible to move away the pad in a so-called "wedge" brake caliper, in which inconvenient geometric and operation conditions for the retraction of the pad are present;

avoids the generation of a residual braking torque, which causes noise, undesired fuel consumption, reduction of performance and other drawbacks;

satisfies the need to keep the pad as close to the disc as possible at the same time;

allows the pad to move away from the braking disc at the end of the braking actions but also allows the contrasting need of avoiding moving it away excessively, whereby making the braking action of the brake less reactive to the user's command;

allows the pad to remain accurately guided by the caliper body;

keeps the retraction action of the piston or roll-back separate from the retraction action of the pad;

positions the retraction device rationally in the caliper body, so that the device does not form an excessive dimension and in that the transverse thrust direction for retraction is repeatable and reliable;

adjusts the thrust intensity of the elastic means in differentiated manner from brake caliper to brake caliper;

provides a double distancing method of the brake pad from the braking surface, in particular by applying a thrust force at a first zone of the caliper body (which is a disc outlet zone according to the variants shown in the drawings), and a reaction generated by an opposite zone of such body (which is a disc inlet zone, as shown) so as to produce a distancing also from such zone by virtue of the specific inclination.

A person skilled in art can make numerous changes and variants to the assembly according to the invention, all contained within the scope of protection defined by the following claims in order to satisfy contingent, specific needs.

REFERENCES 1 brake caliper
1' brake caliper
2 caliper body
3 brake pad
4 pad retraction device
5 braking disc
6 opposite braking surfaces
7 opposite braking surfaces
8 friction material
9 support plate
10 disc brake
11 pad plane
12 first pad abutment surface
13 tapered space
14 retraction surface
15 thrust device
16 working portion
17 working portion
18 second pad abutment surface
19 pad portion
20 pad portion
21 brake pad surface
22 brake pad surface
23 brake pad thickness
24 opening of the first pad abutment surface
25 elastic means of the retraction device
26 elastic means of the retraction device
27 adjustment element of the elastic means
28 guide-spring rod of the retraction device
29 caliper body seat
30 surface of contact
31 working lever
32 brake pad recess
33 cam-shaped element
34 ring portion of the working lever
35 linear slider
36 rotational slider
37 intermediate body
X-X axial direction
Y-Y transverse direction or tangential direction

The invention claimed is:

1. A brake caliper for a disc brake, comprising:
a caliper body,
a brake pad and
at least one retraction device of the brake pad from a braking disc, said at least one retraction device being configured to retract said brake pad from at least one of opposite braking surfaces delimited by the braking disc;
wherein the brake pad comprises a friction material delimiting a pad plane adapted to lean against at least one of the braking surfaces to exert a braking action on the braking disc, said brake pad being adapted to receive a thrust along an axial direction by at least one thrust device hosted in the caliper body;
wherein the caliper body delimits a first pad abutment surface, inclined in a non-orthogonal direction with respect to the pad plane and with respect to said axial direction, to delimit a tapered space with at least one of the braking surfaces of the braking disc, the first pad abutment surface being oriented so that, during the braking action, said first pad abutment surface guides the brake pad wedging in the tapered space;
wherein the brake pad delimits a retraction surface, inclined in a non-orthogonal direction with respect to the pad plane and oriented so that, during the retraction action, the brake pad is guided partially outside of the tapered space, and in that the at least one retraction device of the brake pad comprises a working portion, movable in a transverse direction, incident or substantially orthogonal with respect to the axial direction, said portion being pressed in abutment of the retraction surface, slidably along the latter, to retract the brake pad.

2. The brake caliper according to claim 1, wherein the working portion is an end portion of a linear slider or of a rotational slider, either of which are elastically urged between the caliper body and the retraction surface to retract said brake pad.

3. The brake caliper according to claim 1, wherein the retraction surface makes a cam surface oriented so that the working portion along the transverse direction corresponds to a movement of the brake pad in a direction opposite to the axial direction.

4. The brake caliper according to claim 1, wherein the transverse direction is parallel to, or coincident with, a direction tangential to the brake disc.

5. The brake caliper according to claim 1, wherein the caliper body delimits a second pad abutment surface, opposite to the first pad abutment surface, on which the brake pad is pressed by the working portion, so as to guide said retraction in at least two pad portions of the brake pad.

6. The brake caliper according to claim 5, wherein the incline of the first pad abutment surface, or an incline of the second pad abutment surface, or an incline of brake pad surfaces, intended to slidably abut along the first pad abutment surface and along the second pad abutment surface, are selected so that the advance and retraction with respect to at least one of the braking surfaces are guided maintaining the pad plane substantially parallel.

7. The brake caliper according to claim 1, wherein the retraction surface extends at least partially in the thickness of the brake pad.

8. The brake caliper according to claim 1, wherein the first pad abutment surface delimits an opening for the crossing of the working portion, so that the latter can jut out from the caliper body to lean on the retraction surface.

9. The brake caliper according to claim 1, wherein the working portion is constantly pressed in abutment of the retraction surface, via an elastic structure of the at least one retraction device working—by thrusting or twisting—between the caliper body and said portion.

10. The brake caliper according to claim 9, wherein the elastic structure is in abutment on one part with an adjustment element connected to the caliper body, for adjusting the pre-load force of said structure, and on the other part with the working portion, said adjustment element being maneuverable—in rotation—to change the pre-load force of the elastic structure.

11. The brake caliper according to claim 10, wherein the caliper body and the adjustment element, or a guide-spring rod connected to the caliper body and the adjustment element, are coupled by complementary threads to allow said pre-load force adjustment.

12. The brake caliper according to claim 1, wherein the working portion is slidably, or rotatably, hosted in a seat delimited by the caliper body.

13. The brake caliper according to claim 2, wherein the linear slider comprises a head delimiting a surface of contact with the retraction surface, the surface of contact having substantially the same inclination of the retraction surface.

14. The brake caliper according to claim 1, wherein the rotational slider comprises a working lever hinged to the caliper body, and projecting into a recess of the brake pad partially delimited by the retraction surface.

15. The brake caliper according to claim 14, wherein the elastic structure comprises a helical spring or a torsional spring, promoting a rotation of the working lever via a cam-shaped element in abutment with said lever.

16. The brake caliper according to claim 1, wherein said caliper is a caliper in a fixed caliper body comprising at least one thrust device in each of the opposite sides thereof placed facing opposite said braking surfaces when the caliper is placed straddling the braking disc, and wherein said at least one separate retraction device includes at least two separate retraction devices of the brake pad.

\* \* \* \* \*